US010875277B2

(12) United States Patent
Aoki et al.

(10) Patent No.: US 10,875,277 B2
(45) Date of Patent: Dec. 29, 2020

(54) LAMINATED GLASS

(71) Applicant: AGC Inc., Chiyoda-ku (JP)

(72) Inventors: Tokihiko Aoki, Chiyoda-ku (JP); Shunsuke Sadakane, Chiyoda-ku (JP); Yuji Masaki, Chiyoda-ku (JP); Ayaka Ikegami, Chiyoda-ku (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 16/151,572

(22) Filed: Oct. 4, 2018

(65) Prior Publication Data

US 2019/0105879 A1 Apr. 11, 2019

(30) Foreign Application Priority Data

Oct. 5, 2017 (JP) ................................ 2017-195395
Aug. 23, 2018 (JP) ................................ 2018-156658

(51) Int. Cl.
*B32B 17/10* (2006.01)
*B32B 3/26* (2006.01)
*B60J 1/02* (2006.01)

(52) U.S. Cl.
CPC ........ *B32B 17/10568* (2013.01); *B32B 3/263* (2013.01); *B32B 17/10036* (2013.01); *B32B 17/1077* (2013.01); *B32B 17/10119* (2013.01); *B32B 17/10633* (2013.01); *B32B 17/10651* (2013.01); *B32B 17/10761* (2013.01); *B32B 17/10779* (2013.01); *B32B 17/10788* (2013.01); *B60J 1/02* (2013.01); *B32B 2307/304* (2013.01);

(Continued)

(58) Field of Classification Search
CPC ........ B32B 17/10559; B32B 17/10568; B32B 17/10614–10678; B32B 17/10–10798; B60J 1/00–06
See application file for complete search history.

(56) References Cited

U.S. PATENT DOCUMENTS 5,812,332 A 9/1998 Freeman
6,506,487 B2 * 1/2003 Nagai .............. B32B 17/10036 428/328

(Continued)

FOREIGN PATENT DOCUMENTS

JP 07-175007 7/1995
JP 2017-502125 A 1/2017

(Continued)

OTHER PUBLICATIONS

Achintha, "Sustainability of glass in construction", Sustainability of Construction Materials (2nd ed.), Woodhead Publishing, 2016, p. 79-104 (Year: 2016).*

(Continued)

*Primary Examiner* — Z. Jim Yang
(74) *Attorney, Agent, or Firm* — Element IP, PLC

(57) ABSTRACT

A laminated glass includes a pair of glass plates; and an interlayer located between the glass plates. At least one of the glass plates has a cross section with a wedged shape, and an entire amount of iron in terms of $Fe_2O_3$ in the glass plate having the cross section with the wedged shape is 0.75 mass % or less. The interlayer includes a heat shielding agent, and has a cross section with a wedge angle of 0.2 mrad or less. A total solar transmittance, defined by ISO 13837A, of the laminated glass is 60% or less.

17 Claims, 6 Drawing Sheets

| | configuration | | | | | | wedge angle [mrad] |
|---|---|---|---|---|---|---|---|
| | outer plate | | interlayer | | inner plate | | |
| | glass type | thickness | interlayer type | thickness | glass type | thickness | |
| example 1 | wedge glass 2 | 2 mm + wedge shape | heat shielding interlayer 1 | 0.76 mm | glass 2 | 2 mm | 0.6 |
| comparative example 1 | glass 2 | 2 mm | wedge heat shielding interlayer 1 | 0.76 mm + wedge shape | glass 2 | 2 mm | 0.6 |
| example 2 | wedge glass 2 | 2 mm + wedge shape | heat shielding interlayer 2 | 0.76 mm | glass 2 | 2 mm | 0.6 |
| comparative example 2 | glass 2 | 2 mm | wedge heat shielding interlayer 2 | 0.76 mm + wedge shape | glass 2 | 2 mm | 0.6 |
| example 3 | glass 2 | 2 mm | heat shielding interlayer 2 | 0.76 mm | wedge glass 1 | 2 mm + wedge shape | 0.6 |
| comparative example 3 | glass 2 | 2 mm | wedge heat shielding interlayer 2 | 0.76 mm + wedge shape | glass 1 | 2 mm | 0.6 |
| example 4 | wedge glass 3 | 2 mm | heat shielding interlayer 3 | 0.76 mm | glass 3 | 2 mm | 0.6 |
| comparative example 4 | glass 3 | 2 mm | wedge heat shielding interlayer 3 | 0.76 mm + wedge shape | glass 3 | 2 mm | 0.6 |
| example 5 | glass 2 | 2 mm | heat shielding interlayer 1 | 0.76 mm | wedge glass 2 | 1.8 mm + wedge shape | 0.6 |
| comparative example 5 | glass 2 | 2 mm | wedge heat shielding interlayer 1 | 0.76 mm + wedge shape | glass 2 | 1.8 mm | 0.6 |
| example 6 | glass 3 | 2 mm | heat shielding interlayer 3 | 0.76 mm | wedge glass 3 | 1.8 mm + wedge shape | 0.6 |
| comparative example 6 | glass 3 | 2 mm | wedge heat shielding interlayer 3 | 0.76 mm + wedge shape | glass 3 | 1.8 mm | 0.6 |
| example 7 | wedge glass 2 | 2 mm + wedge shape | heat shielding interlayer 1 | 0.76 mm | glass 2 | 2 mm | 0.3 |
| comparative example 7 | glass 2 | 2 mm | wedge heat shielding interlayer 1 | 0.76 mm + wedge shape | glass 2 | 2 mm | 0.3 |
| example 8 | wedge glass 2 | 2 mm + wedge shape | heat shielding interlayer 2 | 0.76 mm | glass 2 | 2 mm | 0.3 |
| comparative example 8 | glass 2 | 2 mm | wedge heat shielding interlayer 2 | 0.76 mm + wedge shape | glass 2 | 2 mm | 0.3 |
| example 9 | glass 2 | 2 mm | heat shielding interlayer 2 | 0.76 mm | wedge glass 1 | 2 mm + wedge shape | 0.3 |
| comparative example 9 | glass 2 | 2 mm | wedge heat shielding interlayer 2 | 0.76 mm + wedge shape | glass 1 | 2 mm | 0.3 |
| example 10 | wedge glass 3 | 2 mm | heat shielding interlayer 3 | 0.76 mm | glass 3 | 2 mm | 0.3 |
| comparative example 10 | glass 3 | 2 mm | wedge heat shielding interlayer 3 | 0.76 mm + wedge shape | glass 3 | 2 mm | 0.3 |
| example 11 | glass 2 | 2 mm | heat shielding interlayer 1 | 0.76 mm | wedge glass 2 | 1.8 mm + wedge shape | 0.3 |
| comparative example 11 | glass 2 | 2 mm | wedge heat shielding interlayer 1 | 0.76 mm + wedge shape | glass 2 | 1.8 mm | 0.3 |
| example 12 | glass 3 | 2 mm | heat shielding interlayer 3 | 0.76 mm | wedge glass 3 | 1.8 mm + wedge shape | 0.3 |
| comparative example 12 | glass 3 | 2 mm | wedge heat shielding interlayer 3 | 0.76 mm + wedge shape | glass 3 | 1.8 mm | 0.3 |

(52) U.S. Cl.
CPC ..... *B32B 2307/412* (2013.01); *B32B 2311/16* (2013.01); *B32B 2311/30* (2013.01)

(56) References Cited

U.S. PATENT DOCUMENTS

| | | | | |
|---|---|---|---|---|
| 6,998,362 | B2 | 2/2006 | Higby et al. | |
| 2002/0054993 | A1 | 5/2002 | Nagai | |
| 2008/0176043 | A1 | 7/2008 | Masaki et al. | |
| 2011/0308381 | A1* | 12/2011 | Hartley | B32B 17/10174 89/36.02 |
| 2014/0193646 | A1 | 7/2014 | Kitano et al. | |
| 2016/0236446 | A1* | 8/2016 | Nakayama | B32B 17/10036 |
| 2016/0243796 | A1* | 8/2016 | Mannheim Astete et al. | B32B 17/10348 |
| 2016/0250982 | A1* | 9/2016 | Fisher | G10K 11/168 428/215 |
| 2016/0257095 | A1 | 9/2016 | Cleary et al. | |
| 2016/0291324 | A1 | 10/2016 | Arndt et al. | |
| 2016/0341960 | A1 | 11/2016 | Miyai | |
| 2017/0021597 | A1* | 1/2017 | Michetti | B32B 17/10807 |
| 2017/0072663 | A1* | 3/2017 | Sadakane | G02B 27/0101 |
| 2017/0232713 | A1* | 8/2017 | Mannheim Astete | B32B 17/10 428/172 |
| 2017/0274630 | A1 | 9/2017 | Oota et al. | |
| 2017/0305240 | A1* | 10/2017 | Aoki | B32B 5/145 |
| 2017/0313032 | A1 | 11/2017 | Arndt et al. | |
| 2017/0334759 | A1* | 11/2017 | Yamato | C03B 18/18 |
| 2018/0141850 | A1* | 5/2018 | Dejneka | B32B 17/1077 |
| 2018/0264785 | A1 | 9/2018 | Oota et al. | |
| 2018/0312428 | A1* | 11/2018 | Vandal | C03C 3/087 |
| 2018/0326706 | A1 | 11/2018 | Oota et al. | |
| 2018/0370843 | A1* | 12/2018 | Gross | B32B 17/10137 |
| 2019/0054717 | A1* | 2/2019 | Cleary | B32B 17/1077 |
| 2020/0147935 | A1* | 5/2020 | Patrickson | C03C 17/3681 |

FOREIGN PATENT DOCUMENTS

| | | | | |
|---|---|---|---|---|
| WF | WO-2016121559 | A1 * | 8/2016 | B32B 5/145 |
| WO | WO 2016/052422 | A1 | 4/2016 | |
| WO | WO-2016117650 | A1 * | 7/2016 | C03B 18/18 |
| WO | WO 2016/121559 | A1 | 8/2016 | |
| WO | WO 2017/057630 | A1 | 4/2017 | |
| WO | WO-2018181180 | A1 * | 10/2018 | B60J 1/00 |
| WO | WO-2019057477 | A1 * | 3/2019 | B32B 17/10761 |
| WO | WO-2019131802 | A1 * | 7/2019 | B60J 1/00 |

OTHER PUBLICATIONS

Machine translation of WO 2018/181180 A1, obtained from EspaceNet, 2020.*

Machine translation of WO 2019/131803 A1, obtained from EspaceNet, 2020.*

Office Action dated Mar. 15, 2019, in co-penidng U.S. Appl. No. 15/994,225.

Notice of Allowance dated Jul. 18, 2019, in co-pending U.S. Appl. No. 15/994,225.

* cited by examiner

FIG.4

| | total amount of iron in terms of $Fe_2O_3$ (wt%) | Redox (%) | absorbance per 1 mm of plate thickness for wavelength of 1000 nm |
|---|---|---|---|
| glass 1 | 0.08 | 27 | 0.05 |
| glass 2 | 0.5 | 25 | 0.14 |
| glass 3 | 0.71 | 24 | 0.18 |

FIG.5

| | Material of heat shielding agent | Remarks |
|---|---|---|
| heat shielding interlayer 1 | phthalocyanine<br>ITO (tin doped indium oxide) | adjust so that Tv is 73% upon preparing laminated glass with glass 2 of 2t |
| heat shielding interlayer 2 | CWO (cesium tungsten oxide) | |
| heat shielding interlayer 3 | | adjust so that Tv is 73% upon preparing laminated glass with glass 3 of 2t |

FIG.6

| | optical characteristics when laminated glass is prepared with two sheets of clear glass (glass 1) having plate thickness of 2 mm | | | | absorbance ratio (780 nm / 550 nm) |
|---|---|---|---|---|---|
| | Tv [%] | Tts [%] | absorbance at 550 nm | absorbance at 780 nm | |
| heat shielding interlayer 1 | 82.6 | 67.5 | 0.06 | 0.27 | 4.4 |
| heat shielding interlayer 2 | 82.3 | 65.5 | 0.08 | 0.29 | 3.7 |
| heat shielding interlayer 3 | 84.3 | 69.7 | 0.07 | 0.21 | 3.1 |

FIG.7

| | configuration | | | | | | wedge angle [mrad] |
|---|---|---|---|---|---|---|---|
| | outer plate | | interlayer | | inner plate | | |
| | glass type | thickness | interlayer type | thickness | glass type | thickness | |
| example 1 | wedge glass 2 | 2 mm + wedge shape | heat shielding interlayer 1 | 0.76 mm | glass 2 | 2 mm | 0.6 |
| comparative example 1 | glass 2 | 2 mm | wedge heat shielding interlayer 1 | 0.76 mm + wedge shape | glass 2 | 2 mm | 0.6 |
| | | | | | | | |
| example 2 | wedge glass 2 | 2 mm + wedge shape | heat shielding interlayer 2 | 0.76 mm | glass 2 | 2 mm | 0.6 |
| comparative example 2 | glass 2 | 2 mm | wedge heat shielding interlayer 2 | 0.76 mm + wedge shape | glass 2 | 2 mm | 0.6 |
| | | | | | | | |
| example 3 | glass 2 | 2 mm | heat shielding interlayer 2 | 0.76 mm | wedge glass 1 | 2 mm + wedge shape | 0.6 |
| comparative example 3 | glass 2 | 2 mm | wedge heat shielding interlayer 2 | 0.76 mm + wedge shape | glass 1 | 2 mm | 0.6 |
| | | | | | | | |
| example 4 | wedge glass 3 | 2 mm | heat shielding interlayer 3 | 0.76 mm | glass 3 | 2 mm | 0.6 |
| comparative example 4 | glass 3 | 2 mm | wedge heat shielding interlayer 3 | 0.76 mm + wedge shape | glass 3 | 2 mm | 0.6 |
| | | | | | | | |
| example 5 | glass 2 | 2 mm | heat shielding interlayer 1 | 0.76 mm | wedge glass 2 | 1.8 mm + wedge shape | 0.6 |
| comparative example 5 | glass 2 | 2 mm | wedge heat shielding interlayer 1 | 0.76 mm + wedge shape | glass 2 | 1.8 mm | 0.6 |
| | | | | | | | |
| example 6 | glass 3 | 2 mm | heat shielding interlayer 3 | 0.76 mm | wedge glass 3 | 1.8 mm + wedge shape | 0.6 |
| comparative example 6 | glass 3 | 2 mm | wedge heat shielding interlayer 3 | 0.76 mm + wedge shape | glass 3 | 1.8 mm | 0.6 |
| | | | | | | | |
| example 7 | wedge glass 2 | 2 mm + wedge shape | heat shielding interlayer 1 | 0.76 mm | glass 2 | 2 mm | 0.3 |
| comparative example 7 | glass 2 | 2 mm | wedge heat shielding interlayer 1 | 0.76 mm + wedge shape | glass 2 | 2 mm | 0.3 |
| | | | | | | | |
| example 8 | wedge glass 2 | 2 mm + wedge shape | heat shielding interlayer 2 | 0.76 mm | glass 2 | 2 mm | 0.3 |
| comparative example 8 | glass 2 | 2 mm | wedge heat shielding interlayer 2 | 0.76 mm + wedge shape | glass 2 | 2 mm | 0.3 |
| | | | | | | | |
| example 9 | glass 2 | 2 mm | heat shielding interlayer 2 | 0.76 mm | wedge glass 1 | 2 mm + wedge shape | 0.3 |
| comparative example 9 | glass 2 | 2 mm | wedge heat shielding interlayer 2 | 0.76 mm + wedge shape | glass 1 | 2 mm | 0.3 |
| | | | | | | | |
| example 10 | wedge glass 3 | 2 mm | heat shielding interlayer 3 | 0.76 mm | glass 3 | 2 mm | 0.3 |
| comparative example 10 | glass 3 | 2 mm | wedge heat shielding interlayer 3 | 0.76 mm + wedge shape | glass 3 | 2 mm | 0.3 |
| | | | | | | | |
| example 11 | glass 2 | 2 mm | heat shielding interlayer 1 | 0.76 mm | wedge glass 2 | 1.8 mm + wedge shape | 0.3 |
| comparative example 11 | glass 2 | 2 mm | wedge heat shielding interlayer 1 | 0.76 mm + wedge shape | glass 2 | 1.8 mm | 0.3 |
| | | | | | | | |
| example 12 | glass 3 | 2 mm | heat shielding interlayer 3 | 0.76 mm | wedge glass 3 | 1.8 mm + wedge shape | 0.3 |
| comparative example 12 | glass 3 | 2 mm | wedge heat shielding interlayer 3 | 0.76 mm + wedge shape | glass 3 | 1.8 mm | 0.3 |
| | | | | | | | |

FIG.8

| | Tv [%] | | | Tts [%] | | |
|---|---|---|---|---|---|---|
| | lower side | upper side | ΔTv | lower side | upper side | ΔTts |
| example 1 | 73.3 | 71.7 | 1.6 | 53.7 | 52.2 | 1.5 |
| comparative example 1 | 73.3 | 69.7 | 3.6 | 53.7 | 49.9 | 3.8 |
| | | | | | | |
| example 2 | 72.8 | 71.2 | 1.6 | 54.2 | 52.9 | 1.3 |
| comparative example 2 | 72.8 | 68.7 | 4.1 | 54.2 | 49.9 | 4.3 |
| | | | | | | |
| example 3 | 77.4 | 76.8 | 0.6 | 58.8 | 58.4 | 0.4 |
| comparative example 3 | 77.4 | 73.0 | 4.4 | 58.8 | 53.1 | 5.7 |
| | | | | | | |
| example 4 | 73.4 | 71.5 | 1.9 | 55.0 | 53.2 | 1.7 |
| comparative example 4 | 73.4 | 70.5 | 2.8 | 55.0 | 51.4 | 3.5 |
| | | | | | | |
| example 5 | 73.6 | 72.0 | 1.6 | 54.2 | 52.7 | 1.5 |
| comparative example 5 | 73.6 | 70.0 | 3.6 | 54.2 | 50.3 | 3.9 |
| | | | | | | |
| example 6 | 73.9 | 72.0 | 2.0 | 55.4 | 53.7 | 1.8 |
| comparative example 6 | 73.9 | 71.0 | 2.9 | 55.4 | 51.8 | 3.6 |
| | | | | | | |
| example 7 | 73.3 | 72.5 | 0.8 | 53.7 | 52.9 | 0.8 |
| comparative example 7 | 73.3 | 71.7 | 1.5 | 53.7 | 51.9 | 1.8 |
| | | | | | | |
| example 8 | 72.8 | 72.0 | 0.8 | 54.2 | 53.5 | 0.7 |
| comparative example 8 | 72.8 | 71.1 | 1.7 | 54.2 | 52.2 | 2.0 |
| | | | | | | |
| example 9 | 77.4 | 77.1 | 0.3 | 58.8 | 58.6 | 0.2 |
| comparative example 9 | 77.4 | 75.5 | 1.8 | 58.8 | 56.1 | 2.7 |
| | | | | | | |
| example 10 | 73.4 | 72.4 | 1.0 | 55.0 | 54.1 | 0.9 |
| comparative example 10 | 73.4 | 72.2 | 1.2 | 55.0 | 53.3 | 1.6 |
| | | | | | | |
| example 11 | 73.6 | 72.8 | 0.8 | 54.2 | 53.4 | 0.8 |
| comparative example 11 | 73.6 | 72.1 | 1.5 | 54.2 | 52.4 | 1.8 |
| | | | | | | |
| example 12 | 73.9 | 72.9 | 1.0 | 55.4 | 54.5 | 0.9 |
| comparative example 12 | 73.9 | 72.7 | 1.2 | 55.4 | 53.8 | 1.7 |
| | | | | | | |

LAMINATED GLASS

CROSS-REFERENCE TO RELATED APPLICATION

The present application is based on and claims priority under 35 U.S.C. § 119 of Japanese applications No. 2017-195395, filed Oct. 5, 2017, and No. 2018-156658, filed Aug. 23, 2018. The contents of the applications are incorporated herein by reference in their entirety.

BACKGROUND OF THE INVENTION

1. Field of the Invention

The disclosure herein generally relates to a laminated glass.

2. Description of the Related Art

In recent years, head-up displays (in the following, also referred to as an "HUD") have become more and more popular. In a head-up display, an image is reflected on a front windshield of a vehicle so that predetermined information is displayed in a driver's view. However, for driver viewing of a view on an outside of the vehicle or of the information displayed by the HUD, there may be a case where a double image (a transmitted double image and a reflected double image) is a problem.

Then, in the HUD, in order to solve the problem of the double images, a technique of manufacturing a front windshield having a cross section with a wedged shape has been employed. For example a laminated glass, in which an interlayer having a cross section with a wedged shape is interposed between two glass plates, having a cross section with a wedged shape as a whole, has been proposed (See, for example, Japanese Unexamined Patent Application Publication No. 07-175007).

For comfort inside a vehicle, a demand for heat shielding of a front windshield is increasing. Then, in order to give a heat shielding property to a laminated glass with a wedged shape corresponding to an HUD, for example, a heat shielding agent is added to an interlayer (See, for example, WO 2016/052422).

SUMMARY OF THE INVENTION

Technical Problem

However, when an amount of the heat shielding agent in the interlayer is increased in order to enhance the heat shielding property, in an upper part of the front windshield, i.e. in an area where a thickness of the interlayer is large, a visible light transmittance of the glass is decreased, and the safety standard may not be satisfied.

The present invention was made in view of such a problem, and it is an object of the present invention to provide a laminated glass in which a heat shielding agent is added to an interlayer, having a wedge shaped cross section, eliminating a double image of an HUD, and being excellent in the heat shielding property, where the visible light transmittance is prevented from decreasing, and where a visibility through the laminated glass is enhanced.

Solution to Problem

According to an aspect of the present invention, a laminated glass includes a pair of glass plates; and an interlayer located between the glass plates, at least one of the glass plates having a cross section with a wedged shape, and an entire amount of iron in terms of $Fe_2O_3$ in the glass plate having the cross section with the wedged shape being 0.75 mass % or less, the interlayer including a heat shielding agent, and having a cross section with a wedge angle of 0.2 mrad or less, and a total solar transmittance, defined by ISO 13837A, of the laminated glass being 60% or less.

Advantageous Effect of Invention

According to an aspect of the present invention, in a laminated glass having a high heat shielding property, in which a heat shielding agent is added to an interlayer, and a cross section has a wedged shape, a visible light transmittance can be prevented from decreasing.

BRIEF DESCRIPTION OF THE DRAWINGS

Other objects and further features of embodiments will become apparent from the following detailed description when read in conjunction with the accompanying drawings, in which:

FIG. 4 is a diagram depicting a first part of a description of a practical example and a comparative example;

FIG. 5 is a diagram depicting a second part of the description of the practical example and the comparative example;

FIG. 6 is a diagram depicting a third part of the description of the practical example and the comparative example;

FIG. 7 is a diagram depicting a fourth part of the description of the practical example and the comparative example; and FIG. 8 is a diagram depicting a fifth part of the description of the practical example and the comparative example.

DETAILED DESCRIPTION OF THE PREFERRED EMBODIMENTS

Figure 1A:
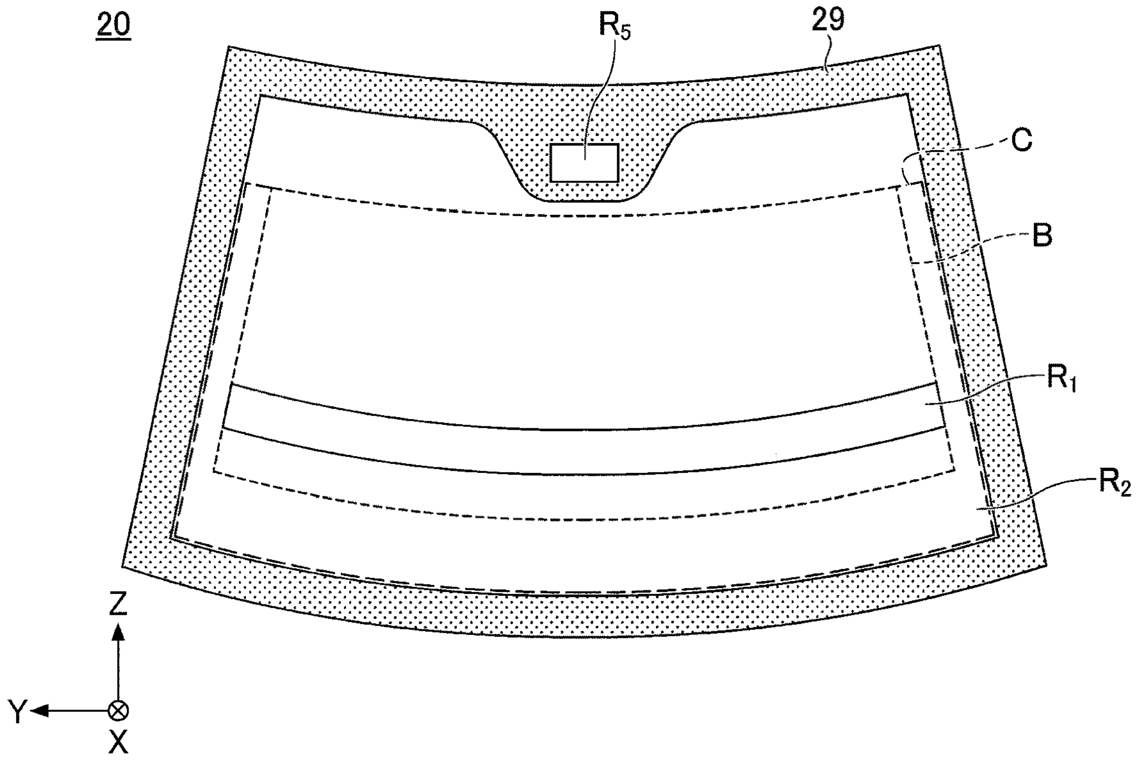
FIGS. 1A and 1B are diagrams depicting examples of a front windshield of a vehicle.

In the following, with reference to drawings, embodiments of the present invention will be described. In each drawing, the same reference numeral is assigned to the same component, and redundant explanation will be omitted. In the following, a front windshield of a vehicle will be described as an example, but the present invention is not limited to this, and the laminated glass according to the embodiment can also be applied to other than the front windshield of a vehicle. Moreover, in the drawings, a part of sizes and shapes are exaggerated in order to easily understand content of the present invention.

FIG. 1 is a diagram depicting an example of a front windshield of a vehicle, and schematically illustrates a state of the front windshield viewed from the inside of the vehicle toward the outside of the vehicle.

As illustrated in FIG. 1A, the front windshield 20 includes an HUD display area $R_1$ used for the HUD, and an area outside the HUD display area $R_2$ (transparent area) that is not used for the HUD. The HUD display area $R_1$ is set to be a region which is irradiated with light from a mirror configuring the HUD when the mirror is rotated and the front windshield 20 is viewed from a V1 point of JIS standard R3212. Note that in the specification of the present application, the transparent area indicates an area in which the visible light transmittance Tv is 70% or more, including, in the case of a test area C defined in the JIS standard R3212 and an information transmission/reception area described later being included, the information transmission/reception area.

The HUD display area R1 is located in a lower part of the front windshield. The area outside the HUD display area is located adjacent to the HUD display area R1 and located around the HUD display area R1 of the front windshield 20. However, the HUD display area may be arranged separated into a plurality of sites in the Y-direction, like an HUD display area R11 and an HUD display area R12, illustrated in FIG. 1B, for example. Alternatively, the HUD display area may be only any one of the HUD display area R11 and the HUD display area R12. Alternatively, the HUD display area may be arranged separated into a plurality of sites in the Z-direction (not shown).

Figure 1B:
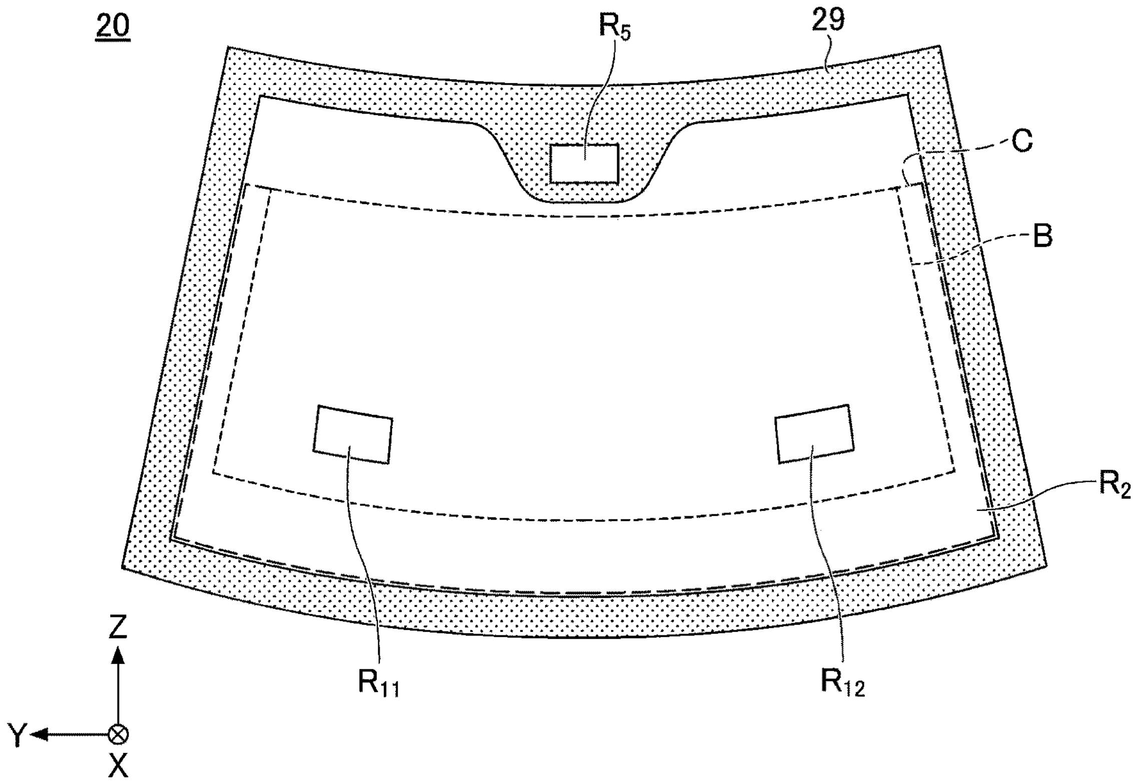

The HUD display areas R1, R11, and R12 are preferably arranged outside the test area A that is defined in JIS standard R3212. The HUD display areas R1, R11, and R12 may be arranged in the test area A defined in JIS standard R3212. Note that the test area A is arranged inside the test area B, but the illustration is omitted in FIGS. 1A and 1B. In FIGS. 1A and 1B, B and C respectively indicate test areas B and C defined by JIS standard R3212.

In a peripheral region of the front windshield 20, a black ceramic layer 29 (shielding layer) is preferably present. The black ceramic layer 29 can be formed by applying an ink for a black ceramic printing, and baking. When the black ceramic layer 29 that is black and opaque is present in the peripheral region of the front windshield 20, a resin such as urethane that fixes the peripheral region of the front windshield 20 on the vehicle body can be prevented from being degraded due to an ultraviolet ray.

The front windshield 20 may have an information transmission/reception area R5 in an upper side peripheral region. The information transmission/reception area R5 can be arranged, for example, in the black ceramic layer 29. The information transmission/reception area R5 functions as a transparent area in the case where a camera or a laser device for distance measurement is arranged in the upper side peripheral region of the front windshield 20.

Figure 2:
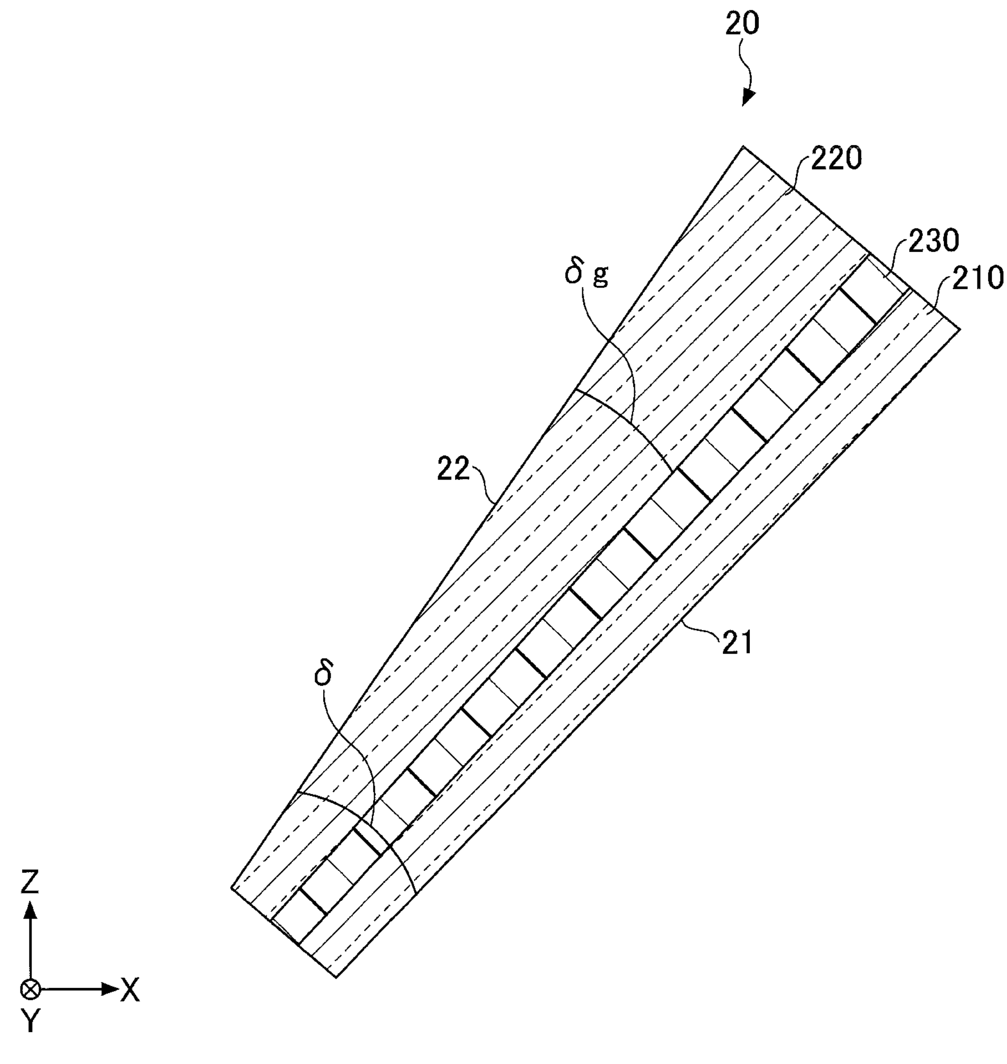
FIG. 2 is a partial cross-sectional view depicting an example of the front windshield 20, illustrated in FIG. 1, cut along an XZ-direction and viewed from a Y-direction.

FIG. 2 is a partial cross-sectional diagram depicting the front windshield 20, illustrated in FIG. 1, cut along the XZ-direction and viewed from the Y-direction. As illustrated in FIG. 2, the front windshield 20 is a laminated glass provided with a glass plate 210, a glass plate 220 and an interlayer 230. In the front windshield 20, the glass plate 210 and the glass plate 220 are fixed in a state of holding the interlayer 230.

An interior surface 21 of the front windshield 20, which is one surface of the glass plate 210 inside the vehicle and an exterior surface 22 of the front windshield 20, which is one surface of the glass plate 220 outside the vehicle, may be flat surfaces or curved surfaces.

The front windshield 20 is formed to have a cross section with a wedged shape, where a thickness increases from the lower edge toward the upper edge of the front windshield 20, when the front windshield 20 is mounted to the vehicle. A wedge angle is δ. Note that the wedge angle δ is obtained by dividing a difference between a thickness of the lower edge and a thickness of the upper edge in the vertical direction along the front windshield 20 by a distance in the vertical direction along the front windshield 20 (i.e. an average wedge angle). Note that the increase in the thickness from the lower edge to the upper edge of the front windshield 20 may be a monotonic increase with a constant proportion of increase, or the proportion of increase may be partially changed.

In the case where the proportion of increase from the lower edge to the upper edge of the front windshield 20 is partially changed, a wedge angle in a part from a central portion of the front windshield 20 including the HUD display area to the lower edge is preferably greater than a wedge angle in a part from a central portion to the upper edge. When the proportion of increase in thickness varies in the front windshield 20, the visible light transmittance in the part of the front windshield 20 near the upper edge can be prevented from decreasing. Moreover, a weight of the front windshield 20 can be prevented from increasing.

The wedge angle δ of the front windshield 20 that is a laminated glass is preferably 0.1 mrad or more and 1.0 mrad or less, and more preferably 0.3 mrad or more and 1.0 mrad or less. When the wedge angle δ is the lower limit or more, an HUD double image is prevented from occurring and a transmitted double image can be sufficiently reduced. Moreover, when the wedge angle δ is the upper limit or less, the visible light transmittance in the part of the front windshield 20 near the upper edge can be prevented from decreasing, and an increase in the weight of the front windshield 20 can be controlled within a range without problems. The wedge angle δ is further preferably 0.3 mrad or more and 0.9 mrad or less, and especially preferably 0.3 mrad or more and 0.8 mrad of less.

In the front windshield 20, the glass plate 220 is formed to have a cross section with a wedged shape, and thicknesses of the glass plate 210 and the interlayer 230 are each uniform. In the glass plate 220, an angle between a surface that will be an exterior surface 22 of the front windshield 20 and a surface contacting the interlayer 230 is the wedge angle δ.

A wedge angle $\delta_g$ of the glass plate having the cross section with the wedged shape (in FIG. 2, glass plate 220) is preferably 0.1 mrad or more and 1.0 mrad or less, and more preferably 0.3 mrad or more and 1.0 mrad or less. When the wedge angle $\delta_g$ is the lower limit or more, an HUD double image is prevented from occurring and a transmitted double image can be sufficiently reduced. Moreover, when the wedge angle $\delta_g$ is the upper limit or less, the visible light transmittance in the part of the front windshield 20 near the upper edge can be prevented from decreasing, and an increase in the weight of the front windshield 20 can be controlled within a range without problems. The wedge angle $\delta_g$ is further preferably 0.3 mrad or more and 0.9 mrad or less, and especially preferably 0.3 mrad or more and 0.8 mrad of less.

In the case where both the glass plate and the interlayer 230 have cross sections with wedged shapes, the wedge angles are adjusted so that a sum of the wedge angle $\delta_g$ of the glass plate and the wedge angle of the interlayer 230 falls within a range of the appropriate wedge angle δ of the front windshield 20.

In FIG. 2, because the thicknesses of the glass plate 210 and the interlayer 230 are uniform, the wedge angle $\delta_g$ of the glass plate 220 is the same as the wedge angle δ between the interior surface 21 and the exterior surface 22 of the front windshield 20 (wedge angle of the entire laminated glass). In the example illustrated in FIG. 2, only the glass plate 220 has the cross section with the wedged shape. However, the thickness of the glass plate 220 may be uniform and the glass plate 210 may have a cross section with a wedged shape. Alternatively, both the glass plates 220 and 210 may have cross sections with wedged shapes. In the case where both the glass plates 220 and 210 have cross sections with wedged angles, the wedge angles of the respective glass plates may be different from each other or may be the same.

Note that the film thickness of the interlayer 230 is preferably uniform (i.e. wedge angle is 0 mrad). However, during the manufacturing process of the laminated glass, some wedge angle may be generated. In this case, a wedge angle of the interlayer 230 of 0.2 mrad or less falls within an allowable range. That is, the wedge angle of the interlayer 230 is preferably 0.2 mrad or less, and more preferably 0.15 mrad or less. When the wedge angle of the interlayer 230 is the upper limit or less, the visible light transmittance Tv of the front windshield 20, in a part where the interlayer 230 becomes thicker, can be prevented from decreasing.

In the case of forming any one of or both the glass plate 210 and the glass plate 220 to have a wedge shape, for example, in the case of manufacturing by using a float method, desired shapes can be obtained by devising a condition upon manufacturing. That is, by controlling circumferential velocities of a plurality of rolls arranged on both ends in the width direction of a glass ribbon that moves on a melted metal, a cross section of a glass in a width direction may be a concave shape, a convex shape, or a tapered shape, and a part that has a desired thickness change may be cut out. Moreover, the glass plate may be adjusted to have a predetermined wedge angle by polishing a surface of the glass plate.

For the glass plates 210 and 220, for example, a soda lime glass, an aluminosilicate glass, or an organic glass may be used. The glass plate 220 arranged on the vehicle exterior side of the front windshield 20 is preferably configured of an inorganic glass from a standpoint of scratch resistance, and is preferably a soda lime glass from a viewpoint of shapability. Moreover, the glass plate having a cross section with a wedged shape is preferably configured of a soda lime glass, because an entire amount of iron in the components in terms of $Fe_2O_3$ is required to be 0.75 mass % or less.

A plate thickness of the thinnest portion of the glass plate 220, which is arranged on the vehicle exterior side of the front windshield 20, is preferably 1.8 mm or more and 3 mm or less. When the plate thickness of the glass plate 220 is 1.8 mm or more, strengths such as a flying stone resistance are sufficient. When the plate thickness is 3 mm or less, the laminated glass is not excessively heavy, and it is preferable from a viewpoint of a fuel efficiency of the vehicle. The plate thickness of the thinnest portion of the glass plate 220 is more preferably 1.8 mm or more and 2.8 mm or less, and further preferably 1.8 mm or more and 2.6 mm or less. In addition, in the case where the plate thickness of the glass plate 220 is constant and the glass plate 210 has a cross section with a wedged shape, the preferable range for the plate thickness of the glass plate 220 arranged on the vehicle exterior side of the front windshield is the same as the aforementioned range.

A plate thickness of the glass plate 210 which is arranged on the vehicle interior side of the front windshield 20 is preferably 0.3 mm or more and 2.3 mm or less, in the case where the thickness is constant. When the plate thickness of the glass plate 210 is less than 0.3 mm, it becomes difficult to handle the glass plate. When the plate thickness is greater than 2.3 mm, it becomes impossible to follow the wedged shape of the interlayer 230 which is a wedge film. The plate thickness of the glass plate 210 is more preferably 0.5 mm or more and 2.1 mm or less, and further preferably 0.7 mm or more and 1.9 mm or less. However, the plate thickness of the glass plate 210 is not always required to be constant, and may vary at any site, as necessary. In addition, in the case where the glass plate 210 arranged on the vehicle interior side of the front windshield 20 has a cross section with a wedged shape, the plate thickness of the thinnest portion preferably falls within the aforementioned range.

The front windshield 20 may either be of a curved shape or a flat shape.

When the front windshield 20 has a curved shape, the glass plates 210 and 220 are shaped by the float method, and afterwards bent and formed before being bonded by the interlayer 230. The bending and forming are performed while the glass is heated and softened. The heating temperature for the glass upon bending and forming is about 550° C. to 700° C.

Returning back to the description of FIG. 2, as the interlayer 230 for bonding the glass plate 210 and the glass plate 220, a thermoplastic resin is often used, including, a thermoplastic resin that has been used conventionally for this kind of purpose, such as a plasticized polyvinyl acetal resin, a plasticized polyvinyl chloride resin, a saturated polyester resin, a plasticized saturated polyester resin, a polyurethane resin, a plasticized polyurethane resin, an ethylene-vinyl acetate copolymer resin, or an ethylene-ethyl acrylate copolymer resin.

Among the above-described resins, a plasticized polyvinyl acetal resin is preferably used, because of its excellence in balance of performances, such as transparency, weather resistance, strength, bond strength, resistance to penetration, absorbability for impact energy, humidity resistance, thermal insulating property, and sound insulating property. The thermoplastic resin may be used singly, or two or more types of thermoplastic resins may be used in combination. The term "plasticized" in the plasticized polyvinyl acetal resin means that the resin is made mouldable by adding a plasticizing agent. The same applies to the other plasticized resins.

The polyvinyl acetal resin may include a polyvinyl formal resin that is obtained by reacting a polyvinyl alcohol (in the following, may be referred to as "PVA" as necessary) and a formaldehyde, a narrowly defined polyvinyl acetal resin that is obtained by reacting a PVA and an acetaldehyde, a polyvinyl butyral resin (in the following, may be referred to as "PVB" as necessary) that is obtained by reacting a PVA and a n-butyl aldehyde, and the like. Especially, a PVB is preferable, because of its excellence in balance of performances, such as transparency, weather resistance, strength, bond strength, resistance to penetration, absorbability for impact energy, humidity resistance, thermal insulating property, and sound insulating property. The polyvinyl acetal resin may be used singly, or two or more types of polyvinyl acetal resins may be used in combination. However, a material forming the interlayer 230 is not limited to a thermoplastic resin.

The film thickness of the thinnest portion of the interlayer 230 is preferably 0.5 mm or more, and more preferably 0.6 mm or more. When the film thickness of the interlayer 230 is the lower limit or more, a required penetration resistance is satisfied for a front windshield. Moreover, the film thickness of the thickest portion of the interlayer 230 is preferably 3 mm or less, more preferably 2 mm or less, and further preferably 1.5 mm or less. When the film thickness of the interlayer 230 is the upper limit or less, the laminated glass is not excessively heavy.

The interlayer 230 is provided with an infrared ray shielding function by containing an infrared ray absorption agent that is a shielding agent. For the infrared ray absorption agent contained in the interlayer 230, as long as a material has a property of selectively absorbing an infrared ray, any material can be used without restriction. For the infrared ray absorption agent, a conventionally known organic or inorganic infrared ray absorption agent can be used. The infrared ray absorption agent may be used singly, or two or more types of agents may be used in combination.

In the interlayer 230, a ratio (A) of an absorbance at a wavelength of 780 nm to an absorbance at a wavelength of 550 nm, measured in a state of a laminated glass, interposed between two clear glasses (glass 1, in which an entire amount of iron in terms of $Fe_2O_3$ is 0.08 mass %, which will be described later) with plate thicknesses of 2 mm, is preferably 1.8 or more, more preferably 2 or more, and further preferably 3 or more. When the ratio of the absorbance of the near infrared ray (780 nm) to the absorbance of the visible light region (550 nm) falls within the above-described range, by combining with a glass plate having a cross section with a prescribed wedged shape, a visible light transmittance is sufficiently large and a visibility is excellent, and furthermore a heat shielding property is also excellent.

For the inorganic infrared ray absorption agent, as fine particles, for example, a cobalt-based pigment, an iron-based pigment, a chromium-based pigment, a titanium-based pigment, a vanadium-based pigment, a zirconium-based pigment, a molybdenum based pigment, a ruthenium-based pigment, a platinum-based pigment, tin-doped indium oxide (ITO) fine particles, antimony-doped tin oxide (ATO) fine particles, or composite tungsten oxide fine particles can be used.

Moreover, for the organic infrared ray absorption agent, for example, a diimmonium pigment, an anthraquinone pigment, an aminium-based pigment, a cyanine-based pigment, a merocyanine-based pigment, a croconium-based pigment, a squalium-based pigment, an azulenium-based pigment, a polymethine-based pigment, a naphthoquinone-based pigment, a pyrylium-based pigment, a phthalocyanine-based pigment, a naphtholactam-based pigment, an azo-based pigment, a condensed azo-based pigment, an indigo-based pigment, a perynone-based pigment, a perylene-based pigment, a dioxazine-based pigment, a quinacridone-based pigment, an isoindolinone-based pigment, a quinophthalone-based pigment, a pyrrole-based pigment, a thioindigo-based pigment, a metal complex-based pigment, a dithiol-based metal complex-based pigment, an indolephenol-based pigment, or a triarylmethane-based pigment may be used.

Among the aforementioned pigments, from a viewpoint of a cost and an absorptance in the infrared ray region, which is higher than that in the visible light region, ITO fine particles, ATO fine particles, or composite tungsten oxide fine particles are preferably used for the inorganic infrared ray absorption agent, and the phthalocyanine-based pigment is preferably used for the organic infrared ray absorption agent. The agent or pigment may be used singly, or two or more types of agents may be used in combination. The phthalocyanine-based agents show a precipitous absorption in the near-infrared ray wavelength region. Thus, in the case where an infrared ray absorbability for a wider range is required, the phthalocyanine-based pigment is preferably combined with at least one type of fine particles selected from the ITO fine particles, the ATO fine particles, and the composite tungsten oxide fine particles, and is used.

The composite tungsten oxide specifically includes a composite tungsten oxide that is expressed by a general formula: $M_xW_yO_z$ (An M element is one element or more selected from Cs, Rb, K, Tl, In, Ba, Li, Ca, Sr, Fe, and Sn; W is tungsten; and O is oxygen, and x, y, and z satisfy $0.001 \le x/y \le 1$, and $2.2 \le z/y \le 3.0$). In the composite tungsten oxide expressed by the aforementioned general formula, a sufficient amount of free electrons are generated, and the oxide effectively functions as an infrared ray absorption agent.

Note that the composite tungsten oxide fine particles expressed by the aforementioned general formula: $M_xW_yO_z$ are excellent in durability in the case of having a crystal structure of a hexagonal crystal, a tetragonal crystal, or a cubic crystal; the fine particles preferably include one or more crystal structures selected from the hexagonal crystal, the tetragonal crystal and the cubic crystal. In the aforementioned crystal structure, a molar ratio of the amount (x) of the M elements to be added to the oxide to the amount (y) of tungsten, i.e. x/y, is 0.001 or more and 1.0 or less. A molar ratio of the amount (z) of oxygen to the amount (y) of tungsten, i.e. z/y, is 2.2 or more and 3.0 or less.

Furthermore, the value of x/y is preferably about 0.33. This is because a value of x/y theoretically calculated from the crystal structure of the cubic crystal is 0.33, and when the composite tungsten oxide fine particles contain the M elements with the value of x/y around 0.33, the fine particles exhibit preferable optical characteristics. Such a composite tungsten oxide, specifically includes $Cs_{0.33}WO_3$ (cesium-tungsten oxide), $Rb_{0.33}WO_3$ (rubidium-tungsten oxide), $K_{0.33}WO_3$ (potassium-tungsten oxide), $Ba_{0.33}WO_3$ (barium-tungsten oxide) or the like. However, the composite tungsten oxide used in the embodiment is not limited to the aforementioned oxides. As long as the values of x/y and z/y fall within the above-described range, the oxide has effective infrared ray absorption characteristics.

The aforementioned composite tungsten oxide is an infrared ray absorption agent, in which a transmittance is known to have a local maximum in a wavelength range of 400 nm to 700 nm and a local minimum in a wavelength range of 700 nm to 1800 nm, in a film in which fine particles of the oxide are uniformly dispersed.

The fine particles of the composite tungsten oxide expressed by the aforementioned general formula: $M_xW_yO_z$ can be manufactured by using a conventionally known method. For example, a tungsten compound starting material, in which an aqueous solution of ammonium tungstate or an aqueous solution of tungsten hexachloride and a chloride, a nitrate, a sulfate, an oxalate, oxide or the like of the element M are mixed at a predetermined ratio, is prepared, and the tungsten compound starting material is subjected to heat treatment under an inert gas atmosphere or a reductive gas atmosphere, and thereby composite tungsten oxide fine particles are obtained.

Note that surfaces of the composite tungsten oxide fine particles are preferably coated with an oxide of a metal selected from Si, Ti, Zr, Al and the like, from a viewpoint of an enhancement of weather resistance. A method of coating is not particularly limited. By adding an alkoxide of the aforementioned metal into a solution, in which the composite tungsten oxide fine particles are dispersed, the surfaces of the composite tungsten oxide fine particles can be coated.

For the aforementioned ATO fine particles and ITO fine particles, fine particles prepared by using the conventionally known various preparation methods, for example, a physical method of obtaining metallic powder by pulverizing using a mechanochemical method or the like; a chemical dry method such as a CVD method, a vapor deposition method, a sputtering method, a heat plasma method, a laser method, or the like; or a chemical wet method such as a thermal decomposition method, a chemical reduction method, an electrolysis method, an ultrasonic method, a laser ablation method, a supercritical fluid method, or a microwave synthesis method, can be used without limitations.

Moreover, the crystal system of the fine particles is not limited to a typical cubic crystal, and a hexagonal crystal ITO with a relatively low infrared ray absorption function can be used as necessary.

An average primary particle diameter in the fine particles of the infrared ray absorption agent is preferably 100 nm or less, more preferably 50 nm or less, and particularly preferably 30 nm or less. When the average primary particle diameter is the upper limit or less, a haze due to scattering (increase of haze) can be prevented from occurring, and it is preferable from a viewpoint of maintaining a transparency of a vehicle laminated glass. Note that a lower limit of the average primary particle diameter is not particularly limited. Infrared ray absorption agent fine particles with a diameter of about 2 nm that can be manufactured in the present technology can also be used. The average primary particle diameter of the fine particles refers to a diameter measured from an observation image by a transmission type electron microscope.

Note that the interlayer 230 may include three or more layers. For example, by configuring the intermediate layer 230 with three layers, and making hardness of the central layer less than hardness of both adjacent layers, the sound insulation function of the laminated glass can be enhanced. In this case, hardness of both the adjacent layers may be the same or may be different from each other. The hardness of the interlayer 230 can be measured as a Shore hardness.

Typically, a light source for HUD is located in a lower part of the vehicle interior, and projects an image toward the laminated glass. Because the projected image is reflected on the rear surface and the front surface of the glass plates 210 and 220, in order to overlay both the reflected images so as not to generate a double image, the plate thickness of the glass plate is required to vary in parallel with respect to the projection direction, that is, in vertical direction. When the plate thickness of the glass plate 210 varies in a direction orthogonal to lines of the glass plate, with respect to use as a glass on which information is projected, the direction of the striations is orthogonal to the projection direction, i.e. the striations are in a horizontal direction with a line of sight of an observer on an inside of the vehicle interior (driver), and use is required in a direction in which the visibility degrades due to a perspective distortion.

In order to improve the visibility, the laminated glass prepared using the glass plate 210, the glass plate 220, and the interlayer 230 is preferably arranged so that the lines of the glass plate 210 are orthogonal to the lines of the glass plate 220. According to the above-described arrangement, the distortion, which deteriorates visibility with use of the glass plate 210 only, will be reduced by the presence of the glass plate 220, having the orthogonal striations as described, and the interlayer 230 that is bonded to the glass plate 210 and the glass plate 220, and in addition to the improvement of the visibility according to the present invention, the visibility is further improved.

In order to prepare the interlayer 230, for example, the aforementioned resin material that configures the interlayer 230 is properly selected, and extruded and formed using an extruder in a heated and molten state. An extrusion condition such as an extrusion speed of the extruder is set to be uniform. Afterwards, the resin film that was extruded and formed is, for example, extended as necessary so that an upper side and a lower side have curvatures fitting to the shape of the front windshield 20, and thereby the interlayer 230 is completed.

In order to prepare the laminated glass, the interlayer 230 is held between the glass plate 210 and the glass plate 220 to form a laminated body. Then, the laminated body is placed into a rubber bag, and the bonding is performed under a vacuum of −65 to −100 kPa (gauge), and at a temperature of about 70 to 110° C.

Furthermore, for example, by performing a pressure bonding process of heating and pressurizing under a condition of a temperature of 100 to 150° C., and a pressure of 0.6 to 1.3 MPa, a laminated glass that is more excellent in durability can be obtained. However, in some cases, taking into account simplification of processes, and characteristics of a material enclosed in the laminated glass, the heating and pressurizing process may not need to be used.

Note that between the glass plate 210 and the glass plate 220, other than the interlayer 230, a film or a device having a function of a heating wire, infrared light reflection, light emission, power generation, dimming, visible light reflection, scattering, decoration, absorption or the like may be arranged.

In the glass plate with a cross section having a wedged shape out of the glass plates 210 and 220 (both the glass plates 210 and 220, in the case where both the glass plates 210 and 220 have cross sections having wedged shapes), a total amount of iron in the components in terms of $Fe_2O_3$ is 0.75 mass % or less. The total amount of iron is preferably 0.6 mass % or less, and more preferably 0.3 mass % or less. When the total amount of iron in the components in terms of $Fe_2O_3$ is 0.75 mass % or less, it becomes possible to increase the transparency of the glass plate. Thus, the visible light transmittance of the laminated glass is great, and the visibility is excellent. The total amount of iron, in the specification, indicates a mass percentage of the total amount of iron in the glass plate in terms of oxide.

In the glass plate with a cross section that does not have a wedged shape out of the glass plates 210 and 220, a total amount of iron in the components in terms of $Fe_2O_3$ is preferably 0.75 mass % or less, and more preferably 0.6 mass % or less.

In the glass plate with the cross section having the wedged shape out of the glass plates 210 and 220 (both the glass plates 210 and 220, in the case where both the glass plates 210 and 220 have cross sections having wedged shapes), from a viewpoint of visibility, an absorbance per 1 mm of a plate thickness for a wavelength of 1000 nm is preferably 0.2 or less, and more preferably 0.15 or less.

Moreover, a maximum value of a ratio of a sum of the plate thicknesses of the glass plates 210 and 220 (T) to a film thickness of the interlayer 230 (t), T/t, is preferably 4.4 or more. When the maximum value of the ratio T/t is 4.4 or more, an effect that a visible light transmittance of the laminated glass is great and the visibility is excellent is obtained.

In the front windshield 20 according to the embodiment, for example, a sum of the plate thicknesses of the glass plates 210 and 220 at the thickest part of the front windshield 20 is T=3.4 mm (for the glass plate 210: constant thickness of 2 mm; for the glass plate 220: a plate thickness of 1.1 mm at the thinnest part, a wedge angle of 0.3 mrad, and a length of the laminated glass in the vertical direction of 1 m), and the film thickness of the interlayer 230 is t=0.76 mm (constant film thickness). In this case, the maximum value of the ratio T/t is 4.5.

In contrast, in the conventional laminated glass, for example, a sum of plate thicknesses of the pair of glass plates at the thickest part of the front windshield is T=4.6 mm (2.3 mm for each plate), a film thickness of the interlayer is t=1.06 (a film thickness of 0.76 mm at the thinnest part, a wedge angle is 0.3 mrad, and a length of the laminated glass in the vertical direction of 1 m). In this case, the maximum value of the ratio T/t is 4.3.

In the test area C on the front windshield 20, a total solar transmittance defined by ISO 13837A (in the following, also denoted simply as Tts) is 60% or less, and is preferably 58% or less. This is because when the total solar transmittance, Tts, is 60% or less, the heat shielding property is excellent, and when the total solar transmittance is 58% or less, the heat shielding property is further enhanced. Note that outside the test area of the front windshield 20 and out of the area having the black ceramic layer, the total solar transmittance Tts may have the same characteristics as in the test area C.

In the area which is the test area C of the front windshield 20 and does not have the black ceramic layer, a visible light transmittance Tv, defined by JIS standard R3212, is preferably 70% or more, and more preferably 72% or more.

A difference (ΔTv) between the visible light transmittances Tv on an upper side and a lower side of a region which is a transparent area and a test area C of the front windshield 20 is preferably 3% or less, more preferably 2.5% or less, and further preferably 2% or less. This is because when the difference ΔTv between the visible light transmittances Tv is 3% or less, a problem in design property, such as a difference in hue depending on a vertical position of the front windshield, does not occur, and the design property is enhanced as the difference ΔTv decreases (2.5% and 2%).

Note that the total solar transmittance Tts and the visible light transmittance Tv in an information transmission/reception area $R_5$ preferably has the same characteristics as in the test area C, in order to protect an information transmission/reception device, such as a camera, which is mounted on the vehicle interior side, from heat, and to acquire visible light information outside the vehicle with a higher accuracy.

In this way, in the front windshield 20, at least one of the glass plates 210 and 220 is a glass plate having a cross section with a wedged shape, in which an entire amount of iron in the components in terms of $Fe_2O_3$ is 0.75 mass % or less. Moreover, an angle of a cross section of the interlayer 230 is 0.2 mrad or less, and the total solar transmittance Tts of the front windshield 20 is 60% or less.

According to the above-described configuration, the visible light transmittance Tv in an area, in which the front windshield 20 is thick (upper side), can be prevented from decreasing, and the difference ΔTv between the visible light transmittances Tv of the upper side and the lower side of the front windshield 20 can be reduced.

Figure 3:
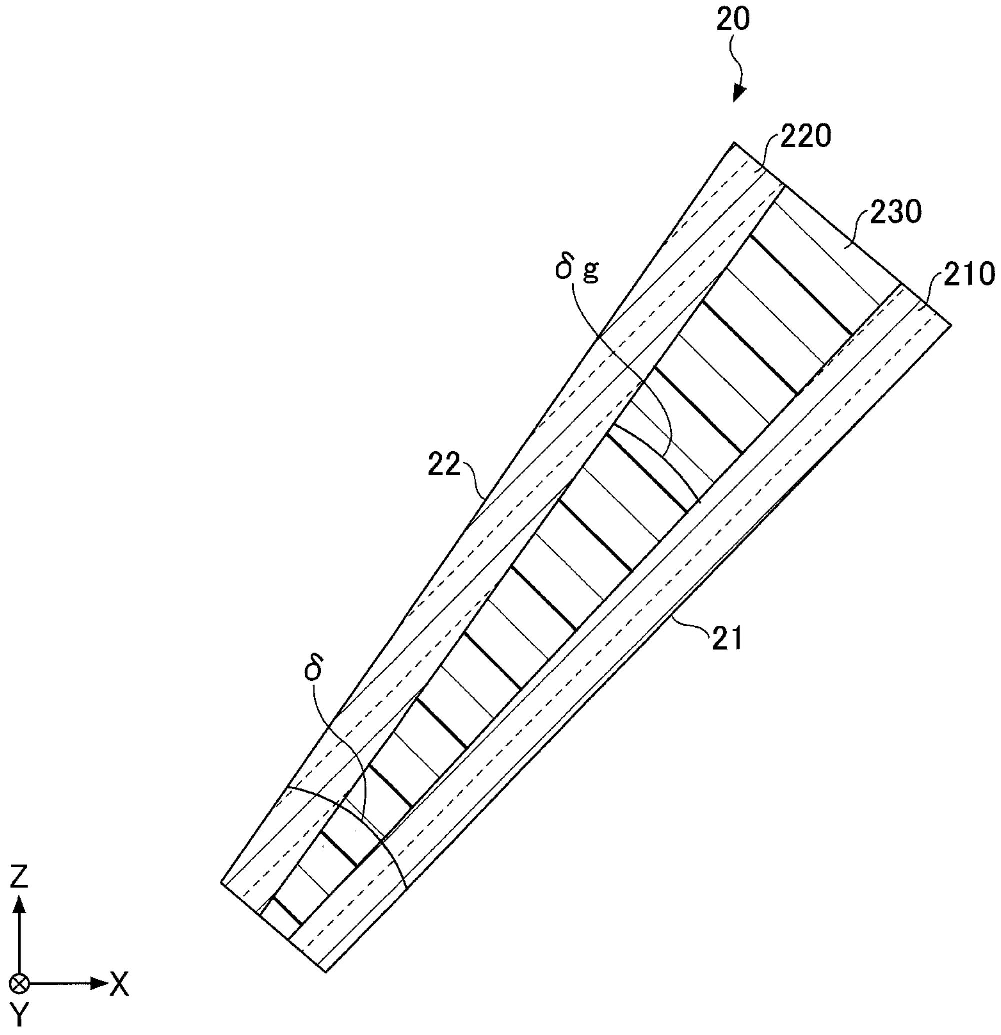
FIG. 3 is a partial cross-sectional view depicting an example of a front windshield according to a comparative example.

Note that FIG. 3 is a partial cross-sectional view depicting an example of a front windshield according to a comparative example, viewed from the same direction as in FIG. 2. As shown in the comparative example illustrated in FIG. 3, the structure, in which the interlayer 230 has a cross section with a wedged shape and the glass plates 210 and 220 having constant plate thickness, is not preferable because of the following reasons:

Although the interlayer 230, to which a heat shielding agent was added, mainly absorbs an infrared ray, an absorbance for a visible light is also not zero. In the interlayer 230, the absorbance for a visible light per 1 mm of thickness is greater than that in the glass plates 210 and 220. Thus, the thickness on the upper side and the thickness on the lower side of the front windshield 20, illustrated in FIG. 2 are the same as the thickness on the upper side and the thickness on the lower side of the front windshield 20, illustrated in FIG. 3, respectively (wedged angles δ are the same). However, the visible light transmittance Tv on the upper side, where the thickness is great, of the front windshield illustrated in FIG. 3, in which the interlayer 230 has the cross section with the wedged shape, is smaller than that in FIG. 2. Thus, the visibility of the windshield illustrated in FIG. 3 is smaller than that in FIG. 2.

That is, in the structure illustrated in FIG. 3, the visible light transmittance Tv on the upper side may become smaller than 70%. Moreover, the difference ΔTv between the visible light transmittances Tv on the upper side and on the lower side increases. Furthermore, apparent hues of the front windshields illustrated in FIGS. 2 and 3, respectively, become different from each other. Thus, there is a problem also in the design properties.

On the other hand, by making the entire amount of iron in the components in the glass plates 210 and 220 in terms of $Fe_2O_3$ a specific value, the absorbance per 1 mm of a plate thickness for a visible light of the glass plates 210 and 220 is less than that of the interlayer 230 to which the heat shielding agent was added. As illustrated in FIG. 2, as an example, by making at least one of the glass plates 210 and 220, in which the absorbance per 1 mm of a plate thickness for a visible light is less than that of the interlayer 230, have a cross section with a wedged shape, the visible light transmittance Tv on the upper side, where the thickness of the front windshield increases, can be made 70% or more. Moreover, in the structure of the front windshield illustrated in FIG. 2, the difference ΔTv between the visible light transmittances Tv of the upper side and the lower side can be reduced, and thereby the design property can be enhanced, a further excellent heat shielding property can be maintained, and a double image of the HUD can be prevented from being generated.

Moreover, the information transmission/reception area $R_5$ of the front windshield is located in the upper side peripheral portion of the front windshield. That is, because the information transmission/reception area is located in a portion where the total thickness of the front windshield is especially thick, corresponding to the double image in the HUD area, in the structure of the front windshield illustrated in FIG. 3, a camera or the like may not properly receive visible light information. By configuring the information transmission/reception area $R_5$ to have the structure of the present invention, the above problems can be solved effectively.

EXAMPLE

Laminated glasses having the configurations illustrated in FIG. 7 were prepared, by appropriately combining a glass 1-3, in which a total amount of iron in the components in terms of $Fe_2O_3$ was 0.75 mass % or less, as listed in FIG. 4, and a heat shielding interlayer 1-3, that was an interlayer to which a heat shielding agent was added, as listed in FIGS. 5 and 6. Any of the sizes of the laminated glasses were 1490 mm (horizontal) and 1100 (height). Each of the laminated glasses was provided with a black ceramic layer in the peripheral region for the front windshield for vehicle. Note that the absorbance ratio in FIG. 6 indicates a ratio of the absorbance (A).

Note that "Redox" in FIG. 4 indicates a weight percentage of divalent iron in terms of $Fe_2O_3$ in the entire iron in terms of $Fe_2O_3$. That is, Redox (%) is expressed by $Fe^{2+}/(Fe^{2+}+Fe^{3+})\times100$. When Redox is kept low, a glass plate with a high visible light transmittance can be obtained, and Redox is preferably 30% or less.

Moreover, in FIG. 5, "2t" in the column "Remarks" indicates that the film thickness was 2 mm and was constant, and a concentration of CWO (cesium tungsten oxide) in the heat shielding interlayer 3 was smaller than that in the heat shielding interlayer 2. Moreover, in FIG. 7, for example, "2 mm" indicates that a thickness was 2 mm and was constant. For example, "2 mm+wedged shape" indicates that a cross section had a wedged shape, and a thickness of the lower side was 2 mm. Moreover, in FIG. 7, for example, "wedged glass 2" indicates that a cross section had a wedged shape, and a type of glass was a glass 2 listed in FIG. 4.

As listed in FIG. 7, in practical examples 1-12, an inner plate (vehicle interior side) or an outer plate (vehicle exterior side) had a cross section with a wedged shape, and an interlayer had a constant thickness. Moreover, in comparative examples 1-12, the interlayer had a cross section with a wedged shape, and the inner plate and the outer plate had constant thicknesses. Then, for the laminated glasses according to the practical examples 1-12 and the comparative examples 1-12 listed in FIG. 7, a visible light transmittance Tv and a total solar transmittance Tts were measured and results listed in FIG. 8 were obtained. Note that values of "lower side" and "upper side" were obtained by measuring in portions within the test area C closest to the lower side and the upper side, respectively.

From FIG. 8, the visible light transmittance Tv of the upper side, in the case where the glass plate had a cross section with a wedged shape, was found to be greater than that of the case where the interlayer had a cross section with a wedged shape, in any combination of the glasses 1-3, in which a total amount of iron in the components in terms of $Fe_2O_3$ was 0.75 mass % or less, and the heat shielding interlayers 1-3.

Moreover, the difference ΔTv between the visible light transmittances Tv, in the case where the glass plate had a cross section with a wedged shape, was found to be smaller than that of the case where the interlayer had a cross section with a wedge shape, in any combination of the glasses 1-3 and the heat shielding layers 1-3.

Moreover, the total solar transmittance Tts was found to be 60% or less, and the difference ΔTts between the total solar transmittances Tts, in the case where the glass plate had a cross section with a wedged shape, was found to be smaller than that of the case where the interlayer had a cross section with a wedged shape, in any combination of the glasses 1-3 and the heat shielding layers 1-3.

Moreover, the effect of increasing the visible light transmittance Tv of the upper side, the effect of reducing the difference ΔTv between the visible light transmittances Tv, and the effect of reducing the difference ΔTts between the total solar transmittances Tts in the case where the wedge angle was 0.6 mrad were more noticeable than those in the case where the wedge angle was 0.3 mrad. That is, when the wedge angle becomes greater, the effect that the glass plate has a cross section with a wedged shape, with respect to the case where the interlayer has a cross section with a wedged shape, appears more noticeably.

In this way, it was confirmed that in a laminated glass, when the glass plate, in which an entire amount of iron in the components in terms of $Fe_2O_3$ was 0.75 mass % or less, had a cross section with a wedged shape, a visible light transmittance Tv in a region, where a thickness of the laminated glass was thick, could be prevented from decreasing. Moreover, it was also confirmed that a difference ΔTv between visible light transmittances Tv of an upper side and of a lower side of the laminated glass could be reduced (a design property could be enhanced). Furthermore, it was confirmed that a total solar transmittance could be reduced to 60% or less, and that a difference ΔTts between total solar transmittances Tts of the upper side and of the lower side, in the case where the glass plate had a cross section with a wedged shape, was less than that of the case where an interlayer had a cross section with a wedge shape (a uniform heat shielding property could be obtained). Moreover, because the laminated glass according to the practical example had a cross section with a wedge angle of a predetermined amount, a double image of an HUD could be prevented from occurring.

As described above, the preferred embodiments and the like have been described in detail. However, the present invention is not limited to the above-described specific embodiments, but various variations and modifications may be made without deviating from the scope of the present invention.

REFERENCE SIGNS LIST

20 front windshield
21 interior surface
22 exterior surface
29 black ceramic layer
210,220 glass plate
230 interlayer
$R_1$, $R_{11}$, $R_{12}$ HUD display area
$R_2$ area outside HUD display area
$R_5$ information transmission/reception area
δ, $\delta_g$ wedge angle

What is claimed is:

1. A laminated glass comprising:

a pair of glass plates, wherein the pair of glass plates are arranged such that lines of a first plate of the pair of glass plates are orthogonal to lines of a second plate of the pair of glass plates; and an interlayer located between the glass plates, wherein the first plate has a cross section with a wedged shape, and has a total amount of iron in terms of $Fe_2O_3$ of from 0.25 to 0.75 mass %, and the second plate has a cross section with a non-wedged shape, and has a total amount of iron in terms of $Fe_2O_3$ of 0.5 mass % or more, wherein the interlayer comprises a heat shielding agent, and has a cross section with a wedge angle of 0.2 mrad or less, wherein a difference between visible light transmittances of a thickest part and a thinnest part of a transparent area of the laminated glass is 2.5% or less, wherein a total solar transmittance, defined by ISO 13837A, of the laminated glass is 60% or less, wherein when the laminated glass is installed as a front windshield of a vehicle, the first plate is positioned on an exterior side of the vehicle, and the second plate is positioned on an interior side of the vehicle, and wherein the laminated glass does not include an infrared light reflection film between the first plate and the second plate.

2. The laminated glass according to claim 1, wherein a wedge angle of a cross section of the laminated glass is 0.3 mrad or more and 1.0 mrad or less.

3. The laminated glass according to claim 1, wherein a wedge angle of the cross section of the first plate is 0.3 mrad or more and 1.0 mrad or less.

4. The laminated glass according to claim 1, wherein the interlayer has a ratio (A) of an absorbance at a wavelength of 780 nm to an absorbance at a wavelength of 550 nm of 1.8 or more, when the absorbance at the wavelength of 780 nm and the absorbance at the wavelength of 550 nm are measured for a laminated glass in which the interlayer is interposed between two clear glasses with plate thicknesses of 2 mm.

5. The laminated glass according to claim 1, wherein the heat shielding agent comprises at least one member selected from a group consisting of a tin-doped indium oxide, an antimony-doped tin oxide, a cesium-tungsten oxide, and a phthalocyanine-based pigment.

6. The laminated glass according to claim 1, wherein a maximum value of a ratio of a sum of plate thicknesses of the pair of glass plates to a film thickness of the interlayer, at a thickest part of the laminated glass, is 4.4 or more.

7. The laminated glass according to claim 1, wherein an information transmission/reception area is arranged in a thickest part of a peripheral portion of the laminated glass.

8. The laminated glass according to claim 7, wherein the information transmission/reception area is arranged in the transparent area.

9. The laminated glass according to claim 1, wherein the difference between visible light transmittances of the thickest part and the thinnest part of the transparent area of the laminated glass is 2% or less.

10. The laminated glass according to claim 1, wherein the first plate has Redox of 30% or less.

11. The laminated glass according to claim 1, wherein the heat shielding agent comprises a tungsten oxide which is coated with an oxide of metal which is at least one selected from the group consisting of Si, Ti, Zr, and Al.

12. The laminated glass according to claim 1, wherein the first plate has a total amount of iron in terms of $Fe_2O_3$ of from 0.25 to 0.3 mass %.

13. The laminated glass according to claim 12, wherein the total solar transmittance, defined by ISO 13837A, of the laminated glass is 58% or less.

14. The laminated glass according to claim 13, wherein the difference between visible light transmittances of the thickest part and the thinnest part of the transparent area of the laminated glass is 1.0% or less.

15. The laminated glass according to claim 1, wherein the first plate has a wedge angle of from 0.6 to 1.0 mrad.

16. A front windshield of a vehicle, comprising the laminated glass according to claim 1, wherein the first plate is positioned on an exterior side of the vehicle, and the second plate is positioned on an interior side of the vehicle.

17. The front windshield according to claim 16, wherein the first plate has a total amount of iron in terms of $Fe_2O_3$ of from 0.25 to 0.3 mass %.

* * * * *